United States Patent

[11] 3,611,116

[72] Inventors: Roblen Khorenovich Balian, ulitsa Drezdenskaya, 20, kv. 5, Leningrad; Igor Efimovich Brusilovsky, ulitsa Kravehenko, 12, kv. 221, Moscow; Mark Isaakovich Roshal, ulitsa Parkhomenko, 47, kv. 8, Leningrad, all of U.S.S.R.
[21] Appl. No.: 2,987
[22] Filed: Jan. 15, 1970
[45] Patented: Oct. 5, 1971

[54] FERRORESONANT VOLTAGE REGULATOR WITH SATURABLE AND UNSATURABLE TRANSFORMERS
5 Claims, 5 Drawing Figs.

[52] U.S. Cl. ................................................ 323/45, 323/60
[51] Int. Cl. ............................................... G05f 3/06
[50] Field of Search ........................... 323/45, 57, 60, 61

[56] References Cited
UNITED STATES PATENTS

| | | | |
|---|---|---|---|
| 2,403,393 | 7/1946 | Peterson | 323/60 |
| 2,448,925 | 9/1948 | Sola | 323/45 X |
| 2,505,620 | 4/1950 | John et al. | 323/45 |
| 2,553,591 | 5/1951 | Kronmiller | 323/60 X |
| 2,967,271 | 1/1961 | Kohn | 323/60 |
| 3,135,894 | 6/1964 | Oglesbee et al. | 323/45 X |
| 3,382,427 | 5/1968 | Quimby | 323/45 X |

Primary Examiner—William H. Beha, Jr.
Assistant Examiner—A. D. Pellinen
Attorney—Waters, Roditi, Schwartz & Nissen ABSTRACT: A ferroresonant voltage regulator has one of the secondaries of an unsaturable transformer connected in series-aiding with one of the windings of a saturable transformer or autotransformer and is included directly in a ferroresonant circuit. A capacitor is connected across the series connection of the secondary winding to form the ferroresonant circuit.

PATENTED OCT 5 1971 3,611,116

FERRORESONANT VOLTAGE REGULATOR WITH SATURABLE AND UNSATURABLE TRANSFORMERS

The present invention relates to AC voltage regulation, and more specifically to ferroresonant voltage regulators.

The invention may be used in supply sources for various devices, notably television receivers, in cases where the main supply is somewhat unstable.

There exist ferroresonant voltage regulators comprising a saturable transformer (or autotransformer); an unsaturable transformer (or an unsaturable reactor with a series winding) whose primary is connected in series with the primary of the saturable transformer (autotransformer), usually having an airgap core; and a capacitor placed across one of the windings (or a part thereof) of the saturable transformer (autotransformer) and forming, along with it, a parallel ferroresonant circuit tuned to the fundamental frequency of the output voltage.

In all existing ferroresonant voltage regulators the secondary of the unsaturable transformer is connected in series with the load and is not included in the ferroresonant circuit directly. On the other hand, the secondary of the unsaturable transformer is connected so as to produce a bucking effect on the voltage across the secondary of the saturable transformer (autotransformer), thereby compensating the partial instability of the output voltage due to the finite value of the slope of the magnetization curve of the saturable transformer (autotransformer), and this is the sole function of the compensating winding.

In existing voltage regulators the voltage across the load is maintained stabilized against variations in the supply voltage mainly by varying the magnitude of the voltage across the main winding of the unsaturable transformer. The magnitude of this voltage and its variations due to regulation must be sufficiently great to make up for total variations in the supply voltage.

A major disadvantage of existing ferroresonant voltage regulators is that it takes a large amount of steel and conductor material to make them. Another disadvantage is that the capacitor of the main ferroresonant circuit is of high value. Still another disadvantage is a considerable total weight.

An object of the present invention is to eliminate the above-mentioned disadvantages.

A specific object of the invention is to provide a ferroresonant voltage regulator which, for the same performance, takes substantially less steel and conductor material to make it, uses a capacitor of smaller value, and has a smaller total weight along with an improved power factor and better efficiency.

The present invention consists of connecting one of the secondaries of an unsaturable transformer in a ferroresonant voltage regulator in series-aiding with one of the windings of a saturable transformer (autotransformer) so as to obtain a cumulative interaction of these windings and forms a portion of a ferroresonant circuit tuned to the fundamental frequency of the voltage. As a result, the output terminals intended for connecting a load are coupled directly to the secondary of the saturable transformer (autotransformer). The output terminals can also be connected to the ends of a circuit made up of the series-connected secondaries of the unsaturable transformer and the saturable transformer (autotransformer). In both cases the capacitive current of the resonant circuit flows directly through the said secondary of the unsaturable transformer. This winding may be connected in series with either the secondary or the primary of the saturable transformer (autotransformer).

For the specified stability of output (load) voltage and temperature rise, the regulator disclosed herein takes less steel and conductor material to make it, uses a smaller capacitor, and has a smaller weight along with an improved power factor and better efficiency.

The invention will be best understood from the following description of a preferred embodiment when read in connection with the accompanying drawings wherein.

Figure 4:
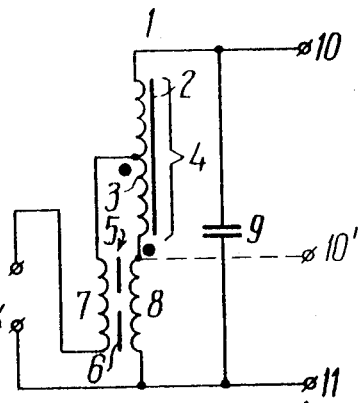
Figure 5:
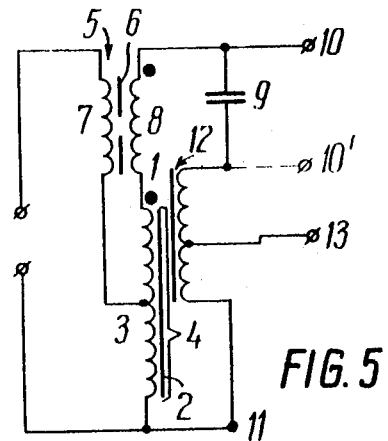

FIG. 4 shows a circuit schematic of the voltage regulator disclosed herein, with the secondary of an unsaturable transformer connected in series with the primary of a saturable transformer; and FIG. 5 shows a circuit schematic of a voltage regulator according to the invention, with the secondary of an unsaturable transformer connected in series with the secondary of a saturable autotransformer, and with the capacitor of the ferroresonant circuit used to reduce the nonlinear distortion of the output voltage.

Figure 1:
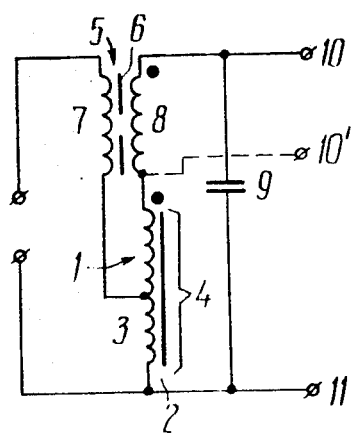
FIG. 1 shows a circuit schematic of the voltage regulator disclosed herein, with the secondary of an unsaturable transformer connected in series with the secondary of a saturable autotransformer.

Referring to FIG. 1, there is a voltage regulator comprising: a saturable autotransformer 1 with a core 2, a primary 3, and a secondary 4; an unsaturable transformer 5 with a core 6 having an airgap, a primary 7, and a secondary 8; a capacitor 9 which along with the autotransformer 1 and the unsaturable transformer 5 makes up a parallel ferroresonant circuit tuned to the fundamental frequency of the voltage. The main voltage is impressed on the winding 3 of the autotransformer 1 through the winding 7 of the transformer 5, connected in series with it. The secondary 4 of the autotransformer 1 and the secondary 8 of the transformer 5 are connected series-aiding and are coupled to the terminals of the capacitor 9.

The output terminals 10' and 11 intended for connecting a load can be coupled to the secondary of the saturable transformer (autotransformer). In some types of regulators the output terminals 10 and 11 intended for connecting a load are coupled to the ends of the series-connected windings 8 of the unsaturable transformer 5 and the windings 4 of the saturable transformer (autotransformer).

Figure 2:
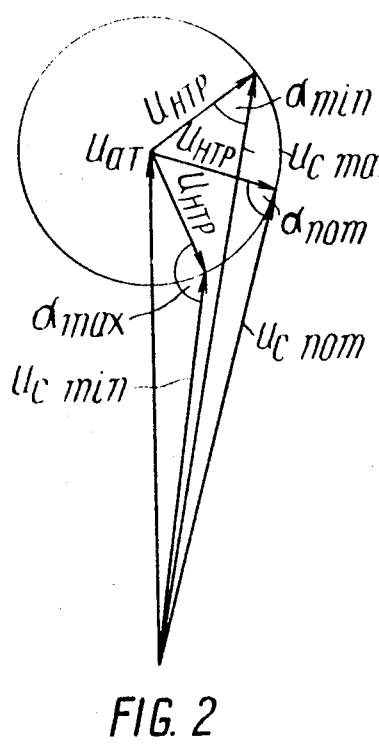
FIG. 2 shows the voltage vector diagram of the voltage regulator disclosed herein.

In the voltage regulator disclosed herein, variations in the supply voltage are compensated mainly by varying the phase displacement between the voltages across the winding 7 of the unsaturable transformer 5 and the winding 3 of the saturable autotransformer 1, while their magnitudes are changed but little, which is favored by the fact that the secondary 8 of the transformer 5 is energized with a capacitive current at the fundamental frequency. This is illustrated by the voltage vector diagram of FIG. 2 where:

$U_{aT}$ is the saturable autotransformer primary voltage vector;
$U_{Cmin}$ is the minimum supply voltage vector;
$U_{Cnom}$ is the nominal supply voltage vector;
$U_{Cmax}$ is the maximum supply voltage vector;
$U_{HTP}$ is the unsaturable transformer primary voltage vector;
$\alpha_{min}$ is the minimum phase displacement between $U_{HTP}$ and $U_{Cnom}$;
$\alpha_{nom}$ is the nominal phase displacement between $U_{HTP}$ and $U_{Cnom}$;
$\alpha_{max}$ is the maximum phase displacement between $U_{HTP}$ and $U_{Cmin}$.

Since in the voltage regulator disclosed herein regulation of the output voltage does not involve large changes in the magnitude of the voltage across the winding 7 of the unsaturable transformer 5, it is possible to reduce both its inductance and the value of the saturation current of the saturable autotransformer 1.

As a consequence, it is possible to reduce the size and weight of the autotransformer 1 and transformer 5, and also the energy taken up by the capacitor 9 compensating the saturation current, without jeopardizing the stabilization effect, the power factor, and the efficiency. This is also facilitated by the fact that within the main zone of regulation—from the nominal to the minimum voltage—the voltage across the capacitor 9 is greater than in conventional types, because within this zone and with the circuit connections as proposed the sum of the voltages across the windings 4 and 8 is greater than each voltage taken separately. As a result, there is an increase in the reactive power delivered by the capacitor. On the other hand, the maximum capacitor voltage occurring when the supply voltage increases and governing the choice of the capacitor is the same as in conventional regulations, because in the case of an increase in the supply voltage the voltages across the windings 4 and 8 are displaced in phase (FIG. 2) so that their sum is practically equal in magnitude to the voltage across the winding 4.

Figure 3:
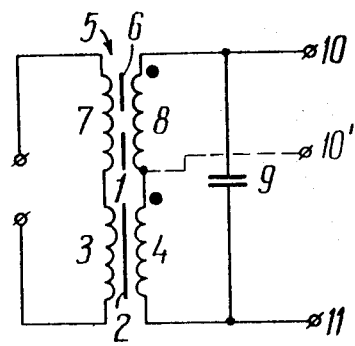
FIG. 3 shows a circuit schematic of the voltage regulator disclosed herein, with the secondary of an unsaturable transformer connected in series with the secondary of a saturable transformer.

In the regulator disclosed herein, the saturable autotransformer may be replaced by a saturable transformer (FIG. 3).

In some cases the secondary 8 of the unsaturable transformer 5 may be connected in series with the primary 3 of the saturable transformer (autotransformer) 1 (FIG. 4).

In a practical voltage regulator, it is convenient to provide taps on the windings 3 and 4 of the saturable transformer (autotransformer) 1 and on the windings 7 and 8 of the unsaturable transformer 5 for optimal tuning, as is usually done on ferroresonant regulators.

Furthermore, it is advisable to use the capacitor of the ferroresonant circuit additionally for control of nonlinear distortion in the output voltage by connecting it in series with a suitable tapped reactor, as is usually done in existing types of ferroresonant regulators.

FIG. 5 shows a circuit schematic of a ferroresonant voltage stabilizer made in accordance with the invention, in which the capacitor 9 of the ferroresonant circuit is used along with a reactor 12 for control of nonlinear distortion in the output voltage, the tap 13 of this reactor being used, as is usually done, for connection of the load for a further reduction in the nonlinear distortion of the output voltage.

This regulator is intended for use in television receivers with a power rating of up to 220 volt-amperes. The nominal supply voltage to be regulated may be 220 volts and 127 volts (a changeover from one to the other is not shown in FIG. 5, because it is of minor consequence). Voltage regulators of this type can maintain an output to within ±1 or 2 percent for a variation of ±20 percent of the supply voltage, which is more than enough for television receivers. With a small decrease in the stability of the output, still lying within the limits specified for television receivers, the range of variations in the supply voltage than can be regulated may be extended to 30 percent. As measured at the nominal supply voltage, the efficiency is not less than 85 percent, the power factor (in terms of regulator input values) is not less than 0.87, the nonlinear distortion factor is about 7 percent, and the temperature rise of the transformer and reactor windings is not over 55° C. when the regulator is built into a plastic case, and a little lower with a metal case.

With the characteristics as given above, the weight of the cores (made of silicon-iron strip or punched laminations) is 2 kg., that of the copper in the windings is 1 kg., the capacitance of the capacitor is 10 to 12 microfarads with a rated voltage of 250 volts RMS, and the total weight of the voltage regulator complete with all structural elements and built into a case is not over 4.5 kg. When use is made of aluminum conductors, the weight of the active material and of the regulator as a whole is further reduced.

In the voltage regulator having the characteristics quoted above use is made of ordinary enamel-insulated wire of normal thermal stability (that is, capable of operation at the class A temperatures). With wire of a greater thermal stability, a further improvement in the performance may be obtained. In contrast, existing ferroresonant voltage regulators have a much greater weight, a greater capacitor, and take more iron and copper (1.5 to 3 times as much) to give the same electrical characteristics. The voltage regulator disclosed herein has a first cost reduced accordingly.

Thus, a ferroresonant voltage regulator built in accordance with the present invention offers advantages, both technical and economical, over existing types.

What is claimed is:

1. A ferroresonant voltage regulator comprising: a saturable autotransformer and an unsaturable transformer having at least one secondary, the primary of said autotransformer connected in series with the primary of said unsaturable transformer and a capacitor connected across a series connection of one secondary of the unsaturable transformer and one of the windings of the saturable autotransformer, to form a parallel ferroresonant circuit tuned to the fundamental frequency of the voltage.

2. A ferroresonant voltage regulator as claimed in claim 1, including output terminals for connection to a load, said output terminals being coupled directly to the secondary of the saturable autotransformer.

3. A ferroresonant voltage regulator as claimed in claim 1, wherein said winding of said saturable autotransformer is the secondary winding, said regulator including output terminals for connection to a load, said output terminals being coupled to the ends of a circuit formed of the secondaries of the unsaturable transformer and of the saturable autotransformer connected in series.

4. A ferroresonant voltage regulator, as claimed in claim 1, wherein said winding of said saturable autotransformer is the secondary winding, the secondary winding of the unsaturable transformer being connected in series-aiding with the secondary of the saturable autotransformer.

5. A ferroresonant voltage regulator, as claimed in claim 1, wherein the winding of said saturable autotransformer is the primary winding, the secondary of the unsaturable transformer being connected in series-aiding with the primary of the saturable autotransformer.